(12) United States Patent
Grover et al.

(10) Patent No.: US 12,095,926 B2
(45) Date of Patent: *Sep. 17, 2024

(54) RETROACTIVELY ADDING ENCRYPTION AND/OR AUTHENTICATION LEVELS TO A BLOCKCHAIN

(71) Applicant: MICRO FOCUS LLC, Santa Clara, CA (US)

(72) Inventors: Douglas Max Grover, Rigby, ID (US); Michael F. Angelo, Houston, TX (US)

(73) Assignee: Micro Focus LLC, Santa Clara, CA (US)

(*) Notice: Subject to any disclaimer, the term of this patent is extended or adjusted under 35 U.S.C. 154(b) by 362 days.

This patent is subject to a terminal disclaimer.

(21) Appl. No.: 17/704,877

(22) Filed: Mar. 25, 2022

(65) Prior Publication Data

US 2023/0308285 A1    Sep. 28, 2023

(51) Int. Cl.
 *H04L 9/32* (2006.01)
 *G06F 21/62* (2013.01)
 *H04L 9/00* (2022.01)
 *H04L 9/38* (2006.01)

(52) U.S. Cl.
 CPC ........ *H04L 9/3242* (2013.01); *G06F 21/6218* (2013.01); *H04L 9/38* (2013.01); *H04L 9/50* (2022.05)

(58) Field of Classification Search
 None
 See application file for complete search history.

(56) References Cited

U.S. PATENT DOCUMENTS

| | | | |
|---|---|---|---|
| 9,774,578 B1* | 9/2017 | Ateniese | G06F 3/0673 |
| 10,686,586 B2 | 6/2020 | Pentland | |
| 2018/0316492 A1* | 11/2018 | Ramachandran | H04L 9/0631 |
| 2019/0199512 A1* | 6/2019 | Pentland | H04L 9/14 |
| 2020/0012809 A1* | 1/2020 | Winarski | H04L 9/3239 |

FOREIGN PATENT DOCUMENTS

| | | |
|---|---|---|
| EP | 3813292 A1 | 4/2021 |
| IN | 202131012555 A | 4/2021 |
| WO | WO-2020047116 A1 | 3/2020 |
| WO | WO-2020108138 A1 | 6/2020 |

* cited by examiner

*Primary Examiner* — Fatoumata Traore
(74) *Attorney, Agent, or Firm* — Sheridan Ross P.C.

(57) ABSTRACT

A request to retroactively add one or more of an encryption level, an encryption type, a security level, and an authentication level to an existing blockchain is received. An authentication/encryption block is added to the existing blockchain. The authentication/encryption block comprises the one or more of the encryption level, the encryption type, the security level, and the authentication level. Based on the added authentication/encryption block in the existing blockchain, the one or more of the encryption level, the encryption type, the security level, and the authentication level are retroactively applied to at least a portion of blockchain data in the existing blockchain. In one embodiment, a data structure is used in place of the authentication/encryption block.

20 Claims, 10 Drawing Sheets

RETROACTIVELY ADDING ENCRYPTION AND/OR AUTHENTICATION LEVELS TO A BLOCKCHAIN

BACKGROUND

One of the advantages of blockchains is that they are considered to be immutable. However, the immutability of a blockchain may be a problem if information that has been stored in the blockchain and is determined to be sensitive and thus should be encrypted. For example, data that once was not considered sensitive, may later become sensitive. Alternatively, sensitive information may have been unintentionally stored in a blockchain. Another problem is that data may be stored using an encryption technique that is now considered not secure enough or where the encryption key has been compromised. Because of the immutable nature of a blockchain, there is currently no way to protect the sensitive information stored in the blockchain and still use the existing blockchain structure.

SUMMARY

These and other needs are addressed by the various embodiments and configurations of the present disclosure. The present disclosure can provide a number of advantages depending on the particular configuration. These and other advantages will be apparent from the disclosure contained herein.

A request to retroactively add one or more of an encryption level, an encryption type, a security level, and an authentication level to an existing blockchain is received. An authentication/encryption block is added to the existing blockchain. The authentication/encryption block comprises the one or more of the encryption level, the encryption type, the security level, and the authentication level. Based on the added authentication/encryption block in the existing blockchain, the one or more of the encryption level, the encryption type, the security level, and the authentication level are retroactively applied to at least a portion of blockchain data in the existing blockchain. In one embodiment, a data structure is used in place of the authentication/encryption block.

The phrases "at least one", "one or more", "or", and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine", "calculate" and "compute," and variations thereof, as used herein, are used interchangeably, and include any type of methodology, process, mathematical operation, or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all the equivalents thereof. Further, the structures, materials or acts and the equivalents thereof shall include all those described in the summary, brief description of the drawings, detailed description, abstract, and claims themselves.

The term "blockchain" as described herein and in the claims refers to a growing list of records, called blocks, which are linked using cryptography. The blockchain is commonly a decentralized, distributed and public digital ledger that is used to record transactions across many computers so that the record cannot be altered retroactively without the alteration of all subsequent blocks and the consensus of the network. Each block contains a cryptographic hash of the previous block, a timestamp, and transaction data (generally represented as a merkle tree root hash). For use as a distributed ledger, a blockchain is typically managed by a peer-to-peer network collectively adhering to a protocol for inter-node communication and validating new blocks. Once recorded, the data in any given block cannot be altered retroactively without alteration of all subsequent blocks, which requires consensus of the network majority. In verifying or validating a block in the blockchain, a hashcash algorithm generally requires the following parameters: a service string, a nonce, and a counter. The service string can be encoded in the block header data structure, and include a version field, the hash of the previous block, the root hash of the merkle tree of all transactions (or information or data) in the block, the current time, and the difficulty level. The nonce can be stored in an extraIlonce field, which is stored as the left most leaf node in the merkle tree. The counter parameter is often small at 32-bits so each time it wraps the extraIlonce field must be incremented (or otherwise changed) to avoid repeating work. When validating or verifying a block, the hashcash algorithm repeatedly hashes the block header while incrementing the counter & extraIlonce fields. Incrementing the extraIlonce field entails recomputing the merkle tree, as the transaction or other information is the left most leaf node. The body of the block contains the transactions or other information. These are hashed only indirectly through the Merkle root.

The preceding is a simplified summary to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

Figure 1:
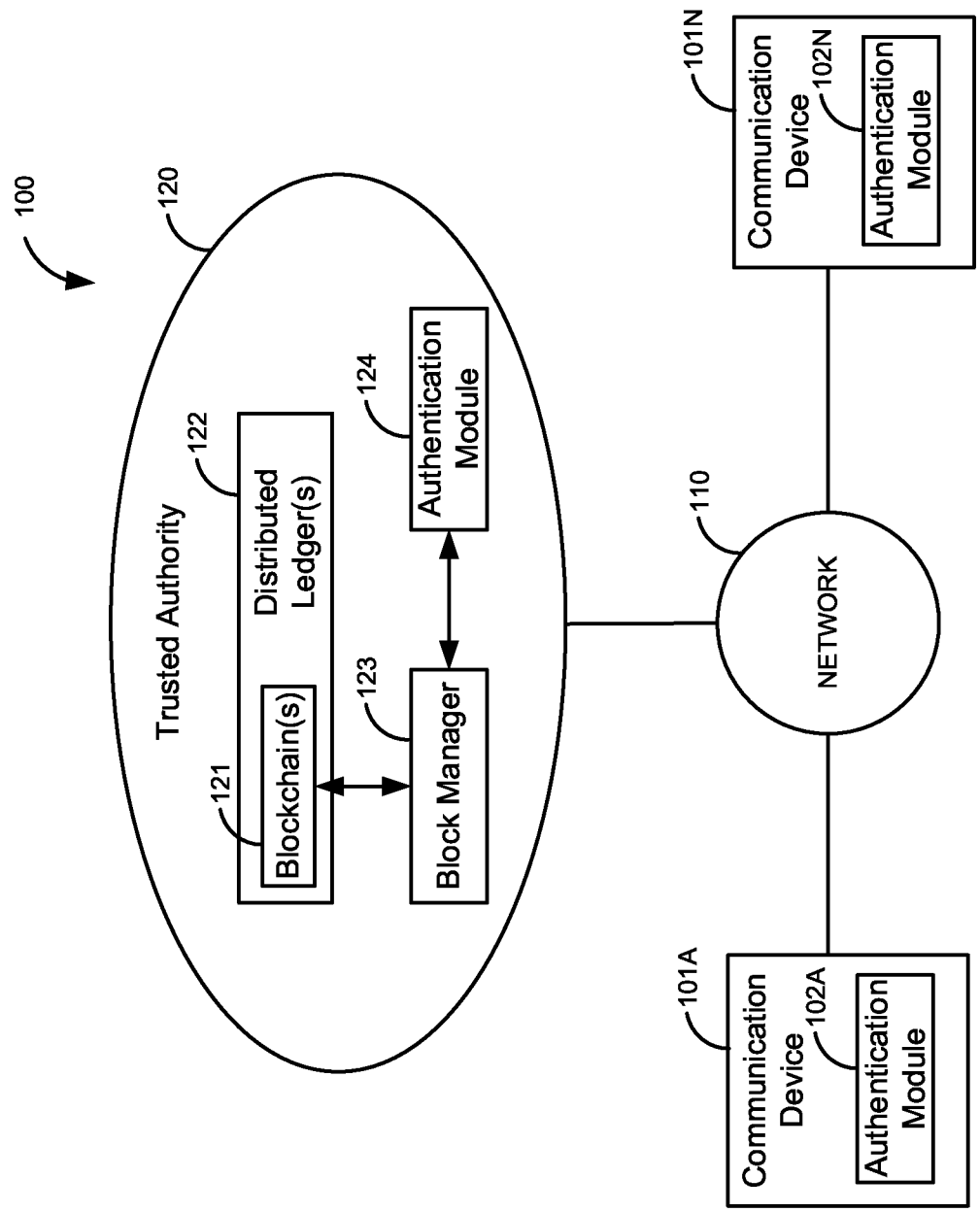
FIG. 1 is a block diagram of a first illustrative system for using a trusted authority to retroactively enforce encryption level(s), encryption type(s), security level(s) and/or authentication level(s) in a blockchain.

FIG. 1 is a block diagram of a first illustrative system 100 for using a trusted authority 120 to retroactively enforce encryption level(s), encryption type(s), security level(s) and/or authentication level(s) in a blockchain 121. The first illustrative system 100 comprises communication devices 101A-101N, a network 110, and the trusted authority 120.

The communication devices 101A-101N can be or may include any device that can communicate on the network 110, such as a Personal Computer (PC), a telephone, a video system, a cellular telephone, a Personal Digital Assistant (PDA), a tablet device, a notebook device, a smartphone, a server, and/or the like. As shown in FIG. 1, any number of communication devices 101A-101N may be connected to the network 110, including only a single communication device 101.

The communication devices 101A-101N further comprise authentication modules 102A-102N. The authentication modules 102A-102N can be or may include any hardware coupled with software that can be used to authenticate a user. The authentication modules 102A-102N may support various types of authentications, such as, username/passwords, Short Message Service (SMS) codes, email codes, biometrics (e.g., a fingerprint scan, an iris scan, a voiceprint, a faceprint, and/or the like), user questions, digital certificates, and/or the like.

The network 110 can be or may include any collection of communication equipment that can send and receive electronic communications, such as the Internet, a Wide Area Network (WAN), a Local Area Network (LAN), a packet switched network, a circuit switched network, a cellular network, a combination of these, and the like. The network 110 can use a variety of electronic protocols, such as Ethernet, Internet Protocol (IP), Hyper Text Transfer Protocol (HTTP), Web Real-Time Protocol (Web RTC), and/or the like. Thus, the network 110 is an electronic communication network configured to carry messages via packets and/or circuit switched communications.

The trusted authority 120 can be or may include any entity, service, process, and/or the like that can be used to provide trusted services. The trusted services may include encryption services, digital certificate management, authentication services, security services, and/or the like. The trusted authority 120 comprises blockchain(s) 121, distributed ledger(s) 122, a block manager 123, and an authentication module 124.

The blockchain(s) 121 may be created using known blockchain structures in conjunction with the processes described herein. The blockchain(s) 121 are typically part of a distributed ledger 122. The distributed ledger 122 is a replicated copy of the blockchain(s) 121 that provide enhanced immutability of the blockchain(s) 121.

The block manager 123 manages the creation of the blockchain 121, adding blocks to the blockchain(s) 121, retroactively applying encryption type(s), encryption level(s), security level(s), and/or authentication level(s). In one embodiment, the block manager 123 works with the distributed ledger 122 to do a consensus vote when a new block is added to the blockchain(s) 121.

The authentication module 124 is used to authenticate a user in conjunction with the authentication modules 102A-102N. The authentication module 124 may provide authentication services for individual users, groups of users, corporations, entities, domains, and/or the like via the communication devices 101A-101N. The authentication module 124 may support any number of authentication services, such as, username/passwords, Short Message Service (SMS) codes, email codes, biometrics (e.g., a fingerprint scan, an iris scan, a voiceprint, a faceprint, and/or the like), user questions, digital certificates, and/or the like.

Figure 2:
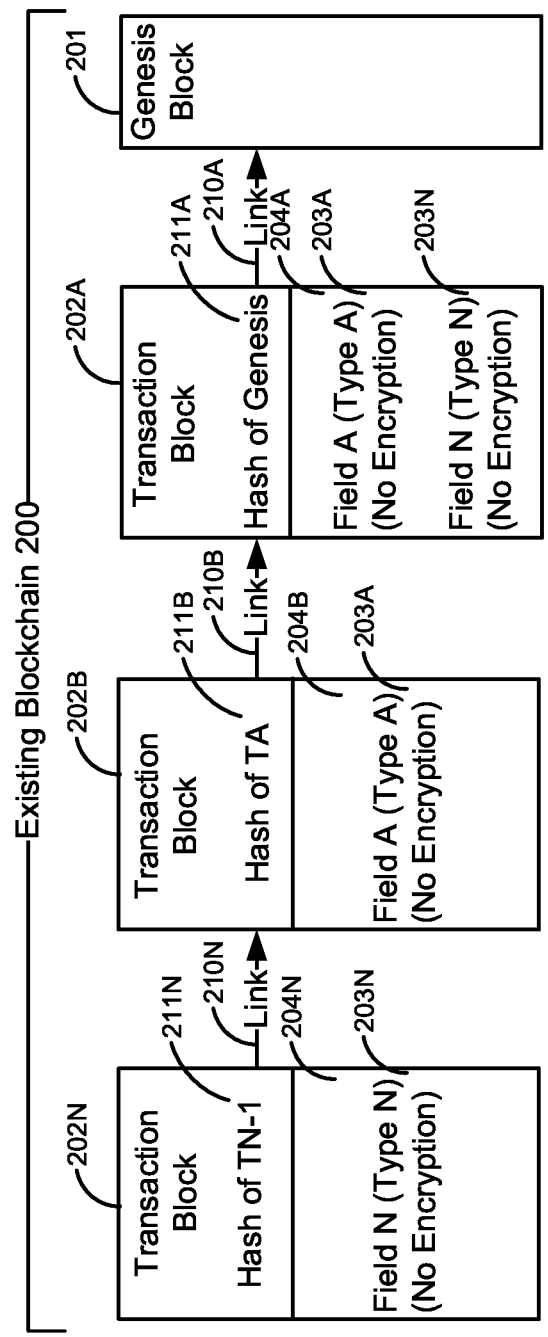
FIG. 2 is a diagram of an exemplary existing blockchain.

FIG. 2 is a diagram of an exemplary existing blockchain 200. The existing blockchain 200 may be any existing blockchain 200, such as, a secure contract blockchain, a digital currency blockchain, an event tracking blockchain, and/or the like. The existing blockchain 200 comprises a genesis block 201 and transaction blocks 202A-202N. The transaction blocks 202A-202N and the genesis block 201 are linked together by forward links 210A-210N as is traditionally done in existing blockchains 200. The genesis block 201 is the first block in the existing blockchain 200.

The transaction blocks 202A-202N further comprise forward hashes 211A-211N, blockchain data 204A-204N, and fields 203A-203N. The forward hashes 211A-211N are forward hashes of the previous block. For example, the transaction block 202N has a forward hash 211N of the transaction block 202B (assuming that there are no intervening transactions blocks 202). The transaction block 202B has a forward hash 211B of the transaction block 202A. Likewise, the transaction block 202A has a forward hash 211A of the genesis block 201.

As shown in FIG. 2, the transaction blocks 202A-202N have blockchain data 204A-204N. The blockchain data 204A-204N may be any data stored in the existing blockchain 200, such as, user information, financial information, database information, documents, records, files, and/or the like. The blockchain data 204A-204N may be in the existing blockchain 200 or pointed to by the blockchain data 204A-204N. The blockchain data 204A-204N may comprise different fields 203A-203N. For example, the blockchain data 204A in the transaction block 202A has fields 203A-203N. The blockchain data 204B in the transaction block 202B only has the field 203A and the blockchain data 204N in the transaction block 202N only has the field 203N. A field 203 may hold a specific type of data. For example, the field 203A may have user address information and field 203N may have a user's credit card numbers/social security number.

In FIG. 2, the fields 203A-203N are not originally encrypted. Thus, the forward hashes 211A-211N are generated based on the unencrypted blockchain data 204A-204N in the fields 203A-203N. When sensitive information (e.g., in field 203N) is identified in an existing blockchain 200, the sensitive information may not be encrypted, may be under encrypted, or may be compromised. In each of these cases, if the unencrypted blockchain data 204A-204N in the fields 203A-203N is encrypted or changed, the forward hashes 211A-211N will fail when the blockchain 121 is validated because the blockchain data 204A-204N in the fields 203A-203N has changed. The forward hashes 211A-211N/distributed ledger 122 are what provides immutability of the existing blockchain 200. What is needed is a way encrypt the sensitive information in the blockchain data 204A-204N/fields 203A-203N while still providing a way maintain the integrity of the forward hashes 211A-211N to detect if the blockchain data 204A-204N/fields 203A-203N have been tampered with.

Figure 3:
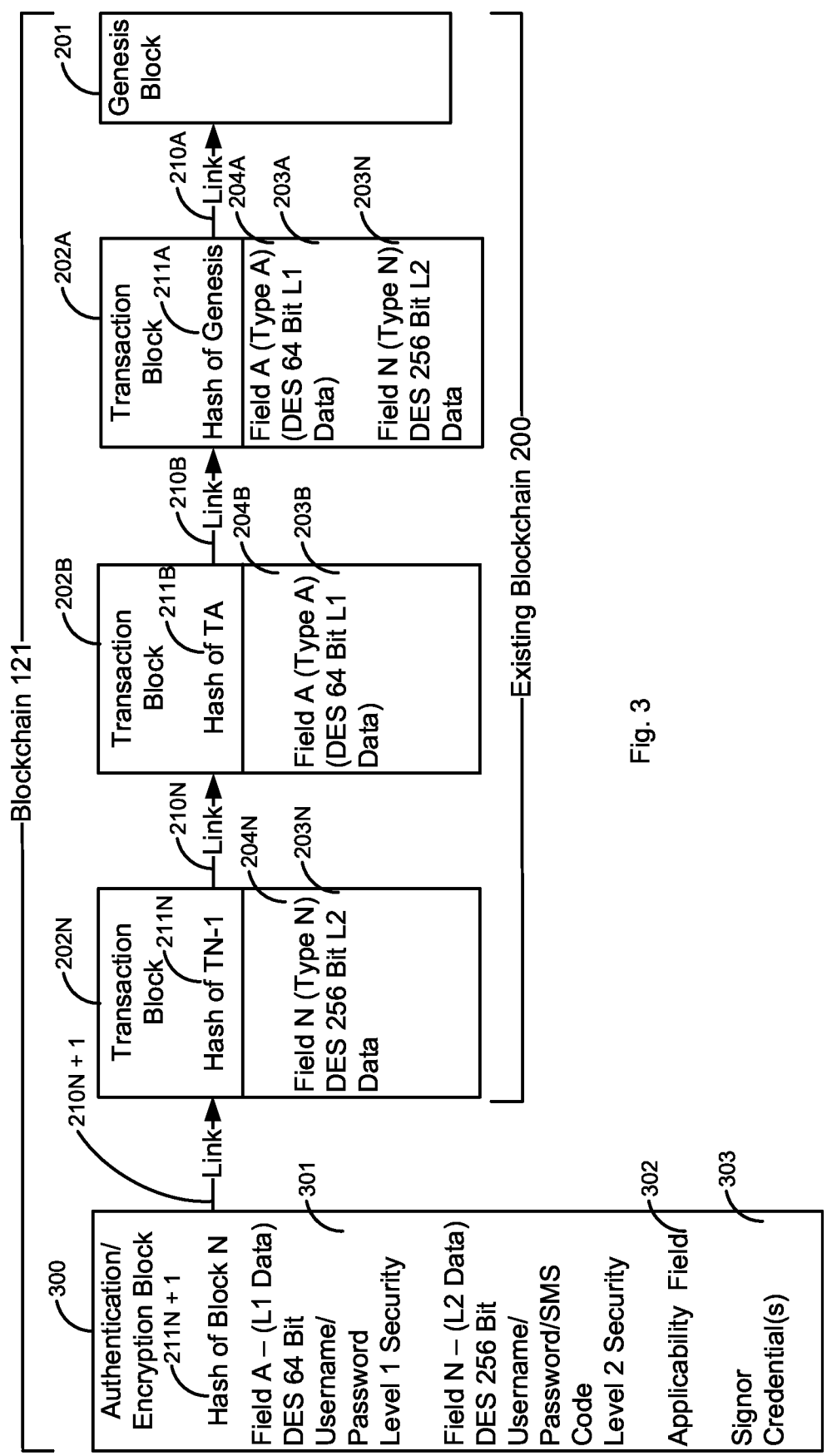
FIG. 3 is a diagram of an existing blockchain with an added authentication/encryption block.

FIG. 3 is a diagram of an existing blockchain 200 with an added authentication/encryption block 300. When the authentication/encryption block 300 is added to the existing blockchain 200, it is referred herein as the blockchain 121. The blockchain 121 comprises the existing blockchain 200 (the genesis block 201/transaction blocks 202A-202N like described in FIG. 2). In addition, the blockchain 121 comprises the authentication/encryption block 300. The authentication/encryption block 300 comprises a forward hash 211N+1 of the transaction block 202N, metadata 301, an applicability field 302, and the signor credential(s) 303. The authentication/encryption block is linked via link 210N+1 to the transaction block 202N.

The authentication/encryption block 300 may be added based on one or more defined rules. For example, only an administrator may be able to add an authentication/encryption block 300 and define the authentication/encryption policies for the authentication/encryption block 300. The authentication/encryption block 300 may have a signor credential 303 of whom added the authentication/encryption block 300. The signor credential 303 may be a plurality of signor credentials 303. For example, to add the authentication/encryption block 300, a user and the user's supervisor may be required to add the authentication/encryption block 300 to the blockchain 121.

The metadata 301 is used to define how encryption type(s), encryption level(s), security level(s), and/or authentication levels are applied to the blockchain 121. The metadata 301 in conjunction with the applicability field 302 define encryption type(s), encryption level(s), security level(s) and/or authentication levels for the authentication/encryption block 300, for the existing blockchain 200, and/or for new transaction blocks 202 that are later added to the blockchain 121.

In this embodiment, the metadata 301 of the authentication/encryption block 300 has metadata 301 for the fields 203A-203N. Although FIG. 3 is described for the fields 203A-203N, the processes of FIG. 3 could be applied at the blockchain data 204A-204N level. The metadata 301 for the field 203A indicates that it is considered level one data, is encrypted using Data Encryption Standard (DES) 64-bit encryption, requires a username/password to access, and requires security level one to access. The metadata 301 for field 203N indicates that it is considered level two data, is encrypted using DES 256-bit encryption, requires a username/password and Short Message Service (SMS) code to access, and requires level two security to access.

The applicability field 302 defines what transaction blocks 202/fields 203 the metadata 301 applies to. The applicability field 302 is described in more detail in FIG. 5. In FIG. 3, the authentication/encryption block 300 is descried as being retroactively applied to the transaction blocks 202A-202N. The field 203A in transaction blocks 202A and 202B is encrypted according to the metadata 301 in the authentication/encryption block 300. In this case, the field 203A in the transaction blocks 202A and 202B is retroactively encrypted using the DES 64-bit encryption algorithm. The 64-bit encryption is the encryption level and DES is the encryption type. Likewise, the field 203N is retroactively encrypted in the transaction blocks 202A and 202N using DES 256-bit encryption. If the field 203 has blockchain data 204 that is pointed to by the field 203, the data pointed to by the field 203 is also encrypted according to the metadata 301 (unless indicated otherwise). Even though the fields 203A-203N have been changed by the encryption process, the forward hashes 211A-211N are not changed and are kept intact in order to preserve the structure/integrity of the existing blockchain 200.

When a distributed ledger 122 is used, the addition of the authentication/encryption block 300 indicates to each node in the distributed ledger 122 to encrypt their copies of the blockchain 121 as described in the authentication/encryption block 300. The trusted authority 120 provides the encryption key(s) to each of the nodes in the distributed ledger 122 to encrypt the respective transaction blocks 202 in the node's blockchain 121. The encryption key may be provided on a temporary basis and deleted by the nodes in the distributed ledger 122 after being used. Alternatively, the trusted authority 120 may provide the newly encrypted transaction block(s) 202 or fields 203A-202N/blockchain data 204A-204N to the other nodes in the distributed ledger 122 when the authentication/encryption block 300 is added.

When a user wants to access the blockchain data 204A-204N/fields 203A-203N, the user must authenticate using the required authentication level and have the proper security level defined in the authentication/encryption block 300 to get the encryption key(s) to unencrypt the fields 203A-203N in the transaction blocks 202A-202N. For example, if the user wanted to access the field 203N in the transaction block 202N, the user would have to logged in with a username/password, provided a valid SMS code, and have level two security clearance. If the user does not have all the proper credentials, the user will not be able to unencrypt/view the fields 203A-203N. Thus, the fields 203A-203N are now retroactively protected using the defined encryption level(s)/type(s).

The above process may work without an authentication/encryption block 300. In this example, when the forward hash(es) 211 in the transaction block(s) 202 do not match the respective generated hashes, the system can check if the blockchain 121 was retroactively encrypted (i.e., the metadata 301 is stored externally to the blockchain 121 in a data structure, such as a database table). The blockchain data 204/fields 203 is unencrypted with the key and then validated. If the user does not have the key (i.e., is not properly authenticated), the process will fail. If the blockchain data 204/field(s) 203 has been tampered with, the encrypted blockchain data 204 information will also fail the hash check even after the blockchain data 204/field(s) have been unencrypted.

The process could also encrypt previously encrypted data (e.g., data originally encrypted using a 64-bit key). For example, a new encryption key and/or algorithm (e.g., an Advanced Encryption Standard (AES) 256-bit encryption algorithm defined in the metadata 301) can be applied to data already encrypted using the 64-bit key. This allows the encryption level of the fields 203A-203N to be retroactively upgraded. Note that this can happen multiple times, and thus would provide resistance to quantum computing attacks. In addition, it also allows for re-encrypting the data if the encryption key is compromised. For example, the re-encryption may use a new encryption key that is the same strength (e.g., also a 64-bit encryption key). In this example, the blockchain data 204A-204N/fields 203A-203N would be encrypted by the compromised 64 encryption bit key and then retroactively encrypted by the new 64-bit encryption key that is not compromised (i.e., doubly encrypted).

The above process could apply to consolidation blocks/blockchains 121 as described in Patent Cooperation Treaty Application No. US2021/033207 entitled "Blockchain Con-solidation with Active Archiving", which is incorporated herein in its entirety by reference. An algorithm may be used to determine the level of encryption for a consolidated blockchain 121 and retroactively encrypt the blockchain data 204. An end block (e.g., an authentication/encryption block 300/end block) of the consolidated blockchain 121 or the consolidation block in the next blockchain 121 may contain the metadata 301 that has encryption information/security level(s)/authentication level(s) required to unencrypt/access the encrypted blockchain data 204/field(s) 203. The encryption/security level/authentication level could be at a blockchain 121 level, at a block level 202/300 or at an individual field 203 level in the consolidated blockchain 121.

The process could also be applied to an archive process. For example, if the blockchain 121 is to be archived, the sensitive information may be retroactively encrypted based one or more rules.

The process could retroactively add individual encryption level(s), encryption type(s), security level(s) and/or authentication level(s) in combination or exclusively. For example, if the blockchain data 204/field(s) 203 are already encrypted, the authentication/encryption block 300 may indicate the authentication levels/security levels required to access the blockchain data 204 in specific transaction block(s) 202, specific blockchain data 204, specific field(s) 203, specific groups of transaction blocks 202, the whole existing blockchain 200, and/or the like. Likewise, only encryption may be added without any authentication levels/security levels.

Figure 4:
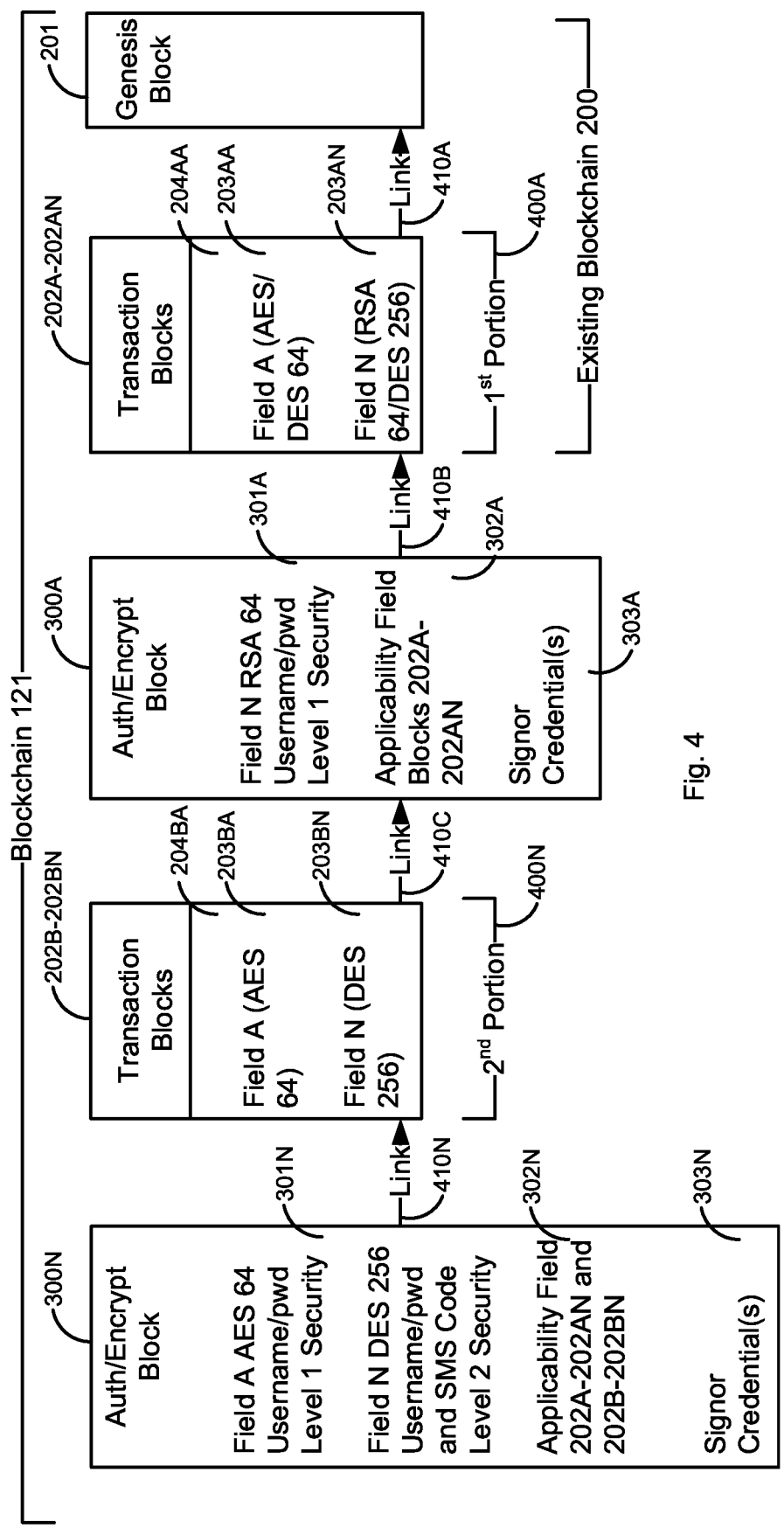
FIG. 4 is a diagram of a blockchain with two added authentication/encryption blocks.

FIG. 4 is a diagram of a blockchain 121 with two added authentication/encryption blocks 300A-300N. The blockchain 121 comprises the genesis block 201, transaction blocks 202A-202AN (which make up the existing blockchain 200), transaction blocks 202B-202BN, and authentication/encryption blocks 300A-300N. The transaction blocks 202A-202AN are referred to as the first portion 400A of the blockchain 121 and the transaction blocks 202B-202BN are referred to as the second portion 400N of the blockchain 121. The transaction blocks 202A-202AN have blockchain data 204AA, and fields 203AA-203AN. The transaction blocks 202B-202BN have blockchain data 204BA, and the fields 203BA-203BN. The transaction blocks 202A-202AN/202B-202BN/authentication/encryption blocks 300A-300N are linked together via forward links 410A-410N. The forward links 410A-410N are like the links 310A-310N. Although not shown for convenience, the transaction blocks 202A-202AN/202B-202BN/authentication/encryption blocks 300A-300B have the forward hashes 211 like described in FIG. 3. In FIG. 4, the fields 203AA and 203AN were both originally not encrypted.

The authentication/encryption block 300A comprises metadata 301A, an applicability field 302A, and signor credential(s) 303A. When the authentication/encryption block 300A is added, based on the metadata 301A/applicability field 302A, the field 203AN is retroactively changed to be encrypted using RSA 64-bit encryption, requires a username/password for access, and level one security for access. The applicability field 302A indicates that the retroactive changes apply to the transaction blocks 202A-202AN (all existing transaction blocks 202 at the time the authentication/encryption block 300A is added).

Later, as the transaction blocks 202B-202BN are added to the blockchain 121, the fields 203BA/203BN are not encrypted because the applicability field 302A indicates that the changes only apply to the transaction blocks 202A-202AN (not new transaction blocks 202B-202BN). When the authentication/encryption block 300N is added to the blockchain 121, the metadata 301N is applied to the blockchain 121. In this example, field A (203AA/203BA) is to be encrypted using AES 64-bit encryption, requires a username/password to access, and requires level one security (same as in the metadata 301A). Since the changes apply to all existing transaction blocks 202A-202AN/202B-202BN, the fields 203AA/203BA in the existing transaction blocks 202A-202AN/202B-202BN are retroactively encrypted using AES 64-bit encryption. Thus, the field 203BA is now encrypted using AES 64-bit encryption. The field 203AA is now doubly encrypted using AES 64-bit encryption/DES 64-bit encryption.

The metadata 301N also indicates that Field N (203AN/203BN) is to be encrypted using DES 256-bit encryption, requires a username/password/a SMS code, and level two security to access. Based on the metadata 301N for field N, the field 203BN is encrypted to DES 256-bit encryption. The field 203AN, is also encrypted using the DES 256-bit encryption. As discussed previously, the field 203AN was previously encrypted using RSA 64-bit encryption based on the metadata 301A of the authentication/encryption block 300A. In other words, the field 203AN is now doubly encrypted using RSA 64-bit encryption and DES 256-bit encryption.

In this example, because of the retroactive application of encryption, the forward hashes 211 in each of the transaction blocks 202A-202AN/202B-202BN would fail because the fields 203AA-203AN/203BA-203BN have been changed by the encryption process. To verify that the forwards hashes 211 are correct, the fields 203AA/203BA will have to be unencrypted before generating the forward hashes 211 (using the DES 64-bit encryption key for field 203BA and the AES 64-bit/DES 64-bit encryption keys for the field 203AA). The field 203BN will have to be unencrypted using the DES 256-bit encryption key before generating the forward hashes 211. The field 203AN will first have to be unencrypted using the DES 256-bit encryption key. The field 203AN will then have to be unencrypted using the RSA 64-bit encryption. Once all the fields 203AA-203AN/203BA-203BN are unencrypted and back to their original value, the forward hashes 211 for verification of the blockchain 121 can be generated to compare against the forward hashes 211 that are in the blockchain 121.

In one embodiment, authentication/encryption block 300B may only apply to specific transaction block(s) 202 in the first portion 400A and/or the second portion 400B. In another embodiment authentication/encryption block 300B may also include the metadata 301A of the authentication/encryption block 300A. For example, authentication/encryption block 300B may indicate that the field 203AN in the transaction blocks 202A-202AN is doubly encrypted using DES 256-bit encryption and RSA 64-bit encryption.

The process of using multiple authentication/encryption blocks 300 may also be used to change authentication levels/authentication types. For example, authentication/encryption block 300B may change the authentication factors/types/number for specific transaction blocks 202, specific blockchain data 204, specific field(s) 203, the whole blockchain 121, and/or the like. The authentication/encryption block 300 B may override the authentication levels/authentication types of the authentication/encryption block 300A.

In one embodiment, the authentication/encryption block 300B could be used to downgrade encryption back to a previous level(s) or a different level. For example, a third authentication/encryption block 300 that is later added to the blockchain 121 of FIG. 4 could be used to remove the DES 256-bit encryption of the authentication/encryption block 300B or remove all previous encryption added by previous authentication/encryption blocks 300A-300N.

In another embodiment, the authentication/encryption block 300 may downgrade the authentication levels. For example, level two data that previous required a username/password/SMS code may be downgraded to only require a username/password. Likewise, the level one data may be downgraded from requiring a username/password to not requiring any credentials to access the blockchain data 204/field(s) 203. The authentication/encryption block 300 may upgrade the authentication levels of specific blockchain data 204/field(s) 203 and downgrade and/or upgrade the authentication levels of other fields 203 in the same transaction block 202, in different blocks, in different portions 400 of the blockchain 121 (e.g., to a previous encryption block), and/or in the whole blockchain 121.

Figure 5:
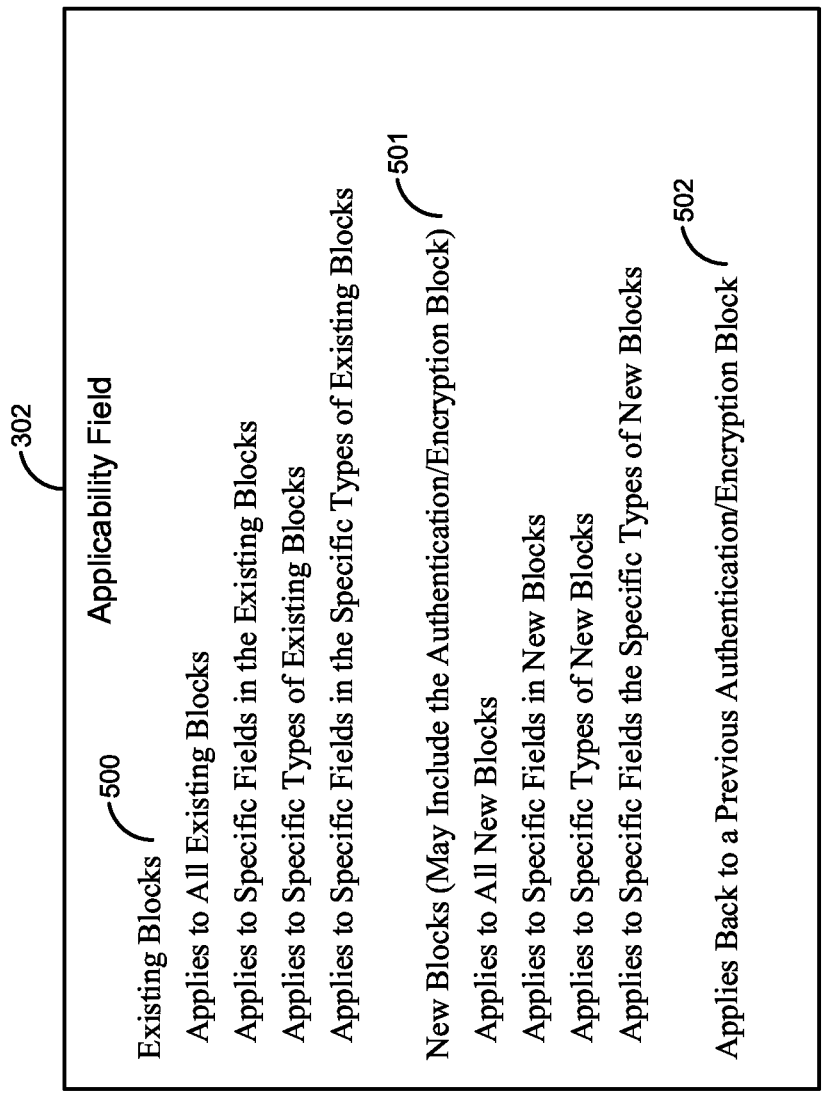
FIG. 5 is a diagram of an exemplary applicability field in an authentication/encryption block.

FIG. 5 is a diagram of an exemplary applicability field 302 in an authentication/encryption block 300. The applicability field 302 (which is part of the metadata 301) is used to define how the encryption level(s), the encryption type(s), the security level(s), and/or the authentication level(s) (hereafter referred to as the authentication/encryption factors) are applied to the blockchain 121. The applicability field 302 comprises an existing blocks field 500, a new blocks field 501, and a previous authentication/encryption block field 502.

The existing blocks field 500 is used to identify how the authentication/encryption factors will be applied to any existing transaction blocks 200 in the blockchain 121/existing blockchain 200. There may be various ways the authentication/encryption factors can be applied to the existing transaction blocks 202. For example, the authentication/encryption factors may apply to all the existing blocks (e.g., to all blockchain data 204/fields 203, to specific fields 203 in the blockchain 121/existing blockchain 200, to specific types of existing blocks (e.g., the transaction blocks 202 for a specific event), to specific fields 203 in the specific types of existing blocks, combination of these, and/or the like).

The new block field 501 is used to identify how the authentication/encryption factors will be applied to any new blocks (e.g., to new transaction blocks 202). There may be various ways the authentication/encryption factors can be applied to the new transaction blocks 202. For example, the authentication/encryption factors may apply to all new blocks that are added to the blockchain 121, to specific fields 203 in the new blocks, to specific types of new blocks, to specific fields 203 of specific types of new blocks, a combination of these, and/or the like.

The previous authentication/encryption block field 502 is used to identify if the authentication/encryption factor(s) are applied back to a previous authentication/encryption block 300. In addition, there may also be rules that are exceptions. For example, the authentication/encryption factors could apply to all existing blocks and to all new blocks except for field X in block Y. In addition, a combination of the types may be used. For example, for the existing blocks, the application of the authentication/encryption factors may be to specific fields 203 in the existing blocks back to the previous authentication/encryption block 300 along with all new blocks. As can be seen, there may be all kinds of combinations based on the existing blocks field 500, the new blocks field 501, and the previous authentication/encryption block field 502.

Figure 6:
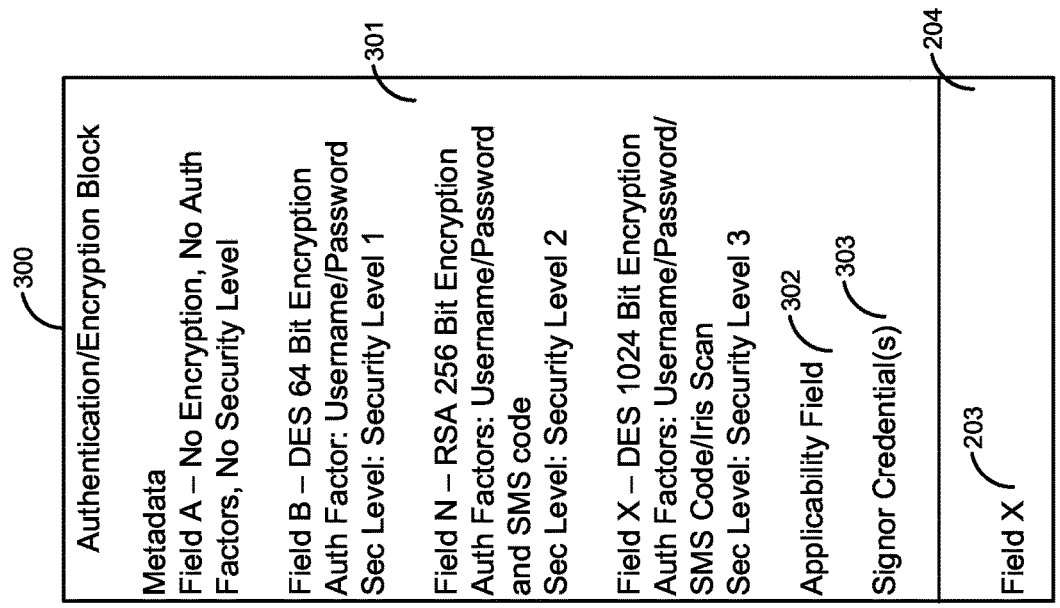
FIG. 6 is a diagram of an exemplary authentication/encryption block.

FIG. 6 is a diagram of an exemplary authentication/encryption block 300. The authentication/encryption block 300 of FIG. 6 is like the authentication/encryption blocks 300 that have been previously discussed in that it comprises the metadata 301, the applicability field 302, and the signor credential(s) 303. In addition, the authentication/encryption block 300 comprises the blockchain data 204/field(s) 203.

In this embodiment, the metadata 301 may be applied to the blockchain data 204/field(s) 203 within the authentication/encryption block 300. For example, the metadata 301 of the authentication/encryption block 300 in FIG. 6 indicates that field X is encrypted using DES 1024-bit encryption, requires authentication factors username/password, SMS code, and iris scan, along with level three security. In this example, the applicability field 302 would indicate that the field 203 is applied to the authentication/encryption block 300. Thus, when the authentication/encryption block 300 is added to the blockchain 121/200, the field 203 (field X) is encrypted using DES 1024-bit encryption.

Figure 7:
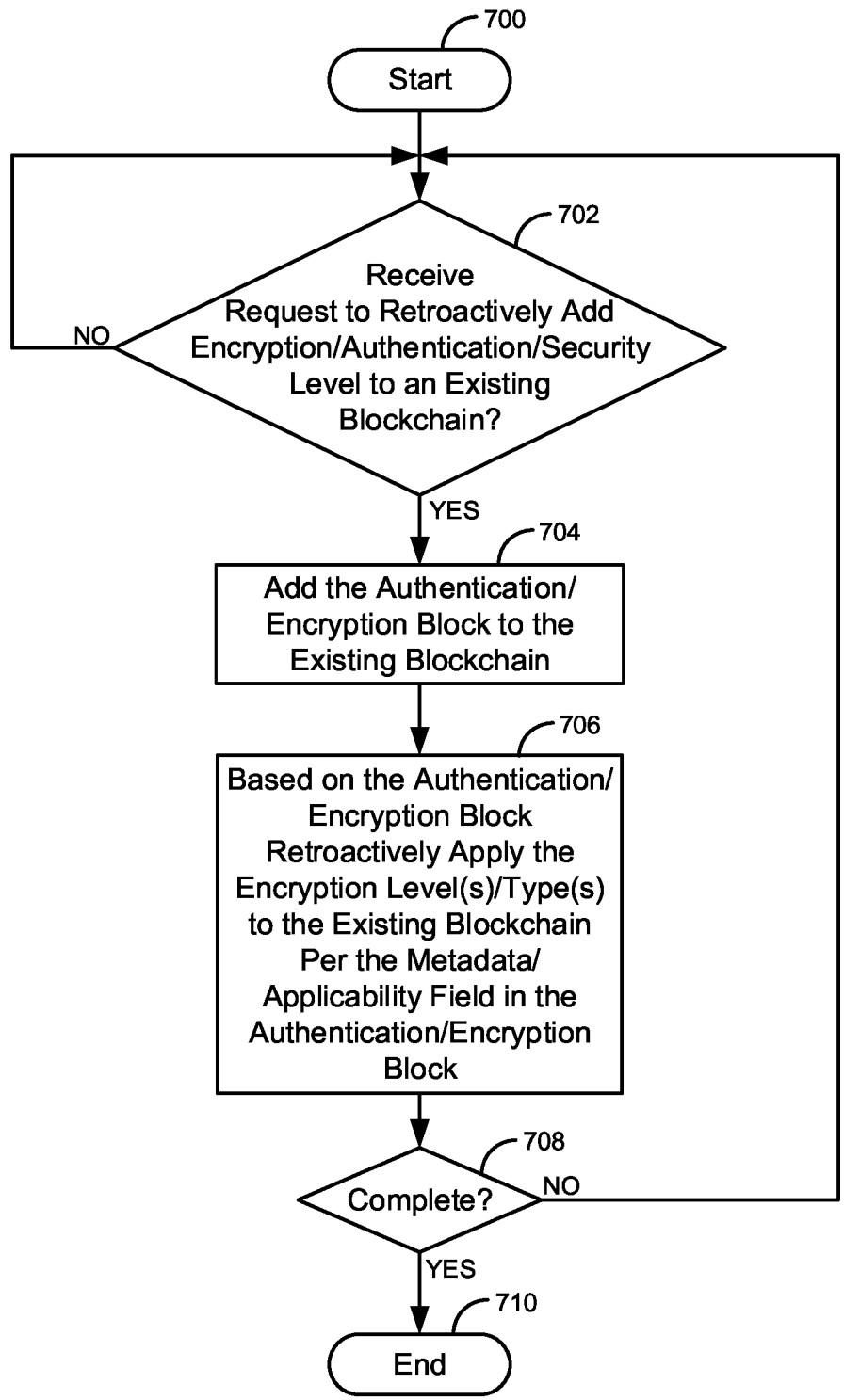
FIG. 7 is a flow diagram of a process for retroactively adding encryption level(s), encryption type(s), security level(s), and/or authentication level(s) to an existing blockchain.
Figure 8:
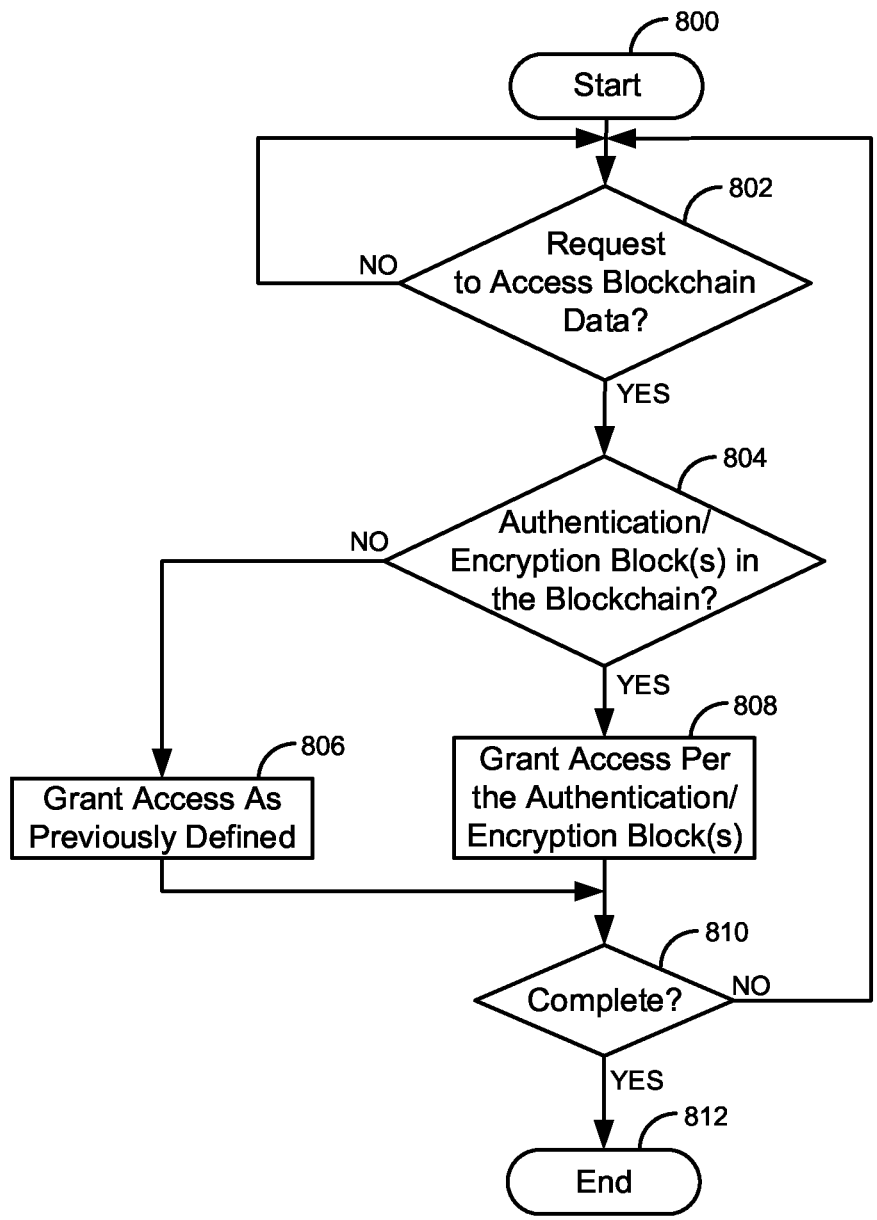
FIG. 8 is a flow diagram of a process for managing authentication based on retroactively added security level(s) and/or authentication level(s).
Figure 9:
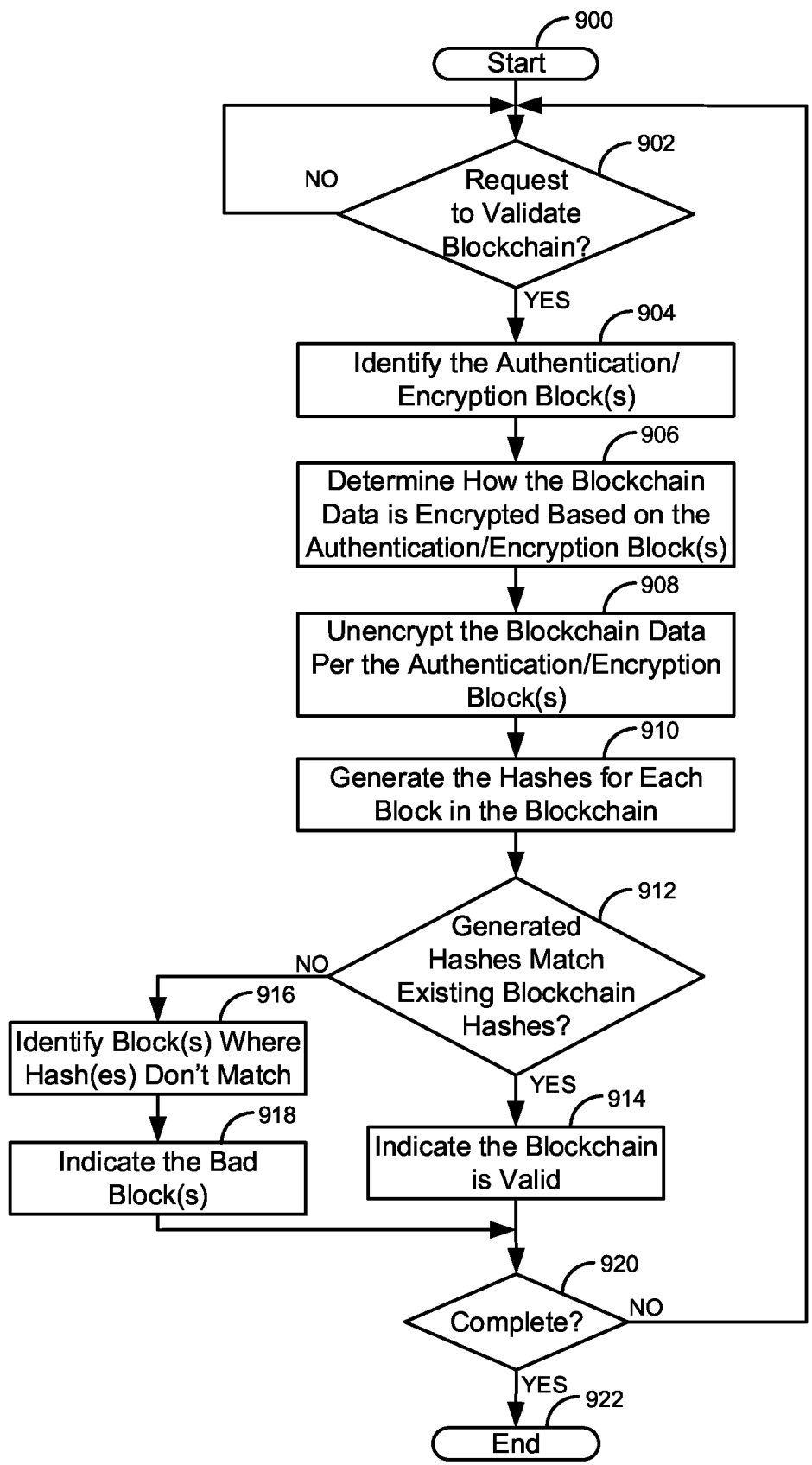
FIG. 9 is a flow diagram of a process for generating hashes of blocks where encryption type(s) and/or encryption level(s) have been retroactively added to a blockchain.

FIG. 7 is a flow diagram of a process for retroactively adding encryption level(s), encryption type(s), security level(s), and/or authentication level(s) to an existing blockchain 200. Illustratively, the communication devices 101A-101N, the authentication modules 102A-102N, the trusted authority 120, the blockchains 121/200, the distributed ledger 122, the block manager 123, and the authentication module 124 are stored-program-controlled entities, such as a computer or microprocessor, which performs the method of FIGS. 7-9 and the processes described herein by executing program instructions stored in a computer readable storage medium, such as a memory (i.e., a computer memory, a hard disk, and/or the like). Although the methods described in FIGS. 7-9 are shown in a specific order, one of skill in the art would recognize that the steps in FIGS. 7-9 may be implemented in different orders and/or be implemented in a multi-threaded environment. Moreover, various steps may be omitted or added based on implementation.

The process starts in step 700. The block manager 123 waits, in step 702, to receive a request to retroactively add encryption type(s), encryption level(s), security level(s), and/or authentication level(s) to the existing blockchain 200 (or the blockchain 121 if an authentication/encryption block 300 has already been added). If a request to add the encryption type(s), encryption level(s), security level(s), and/or authentication level(s) is not received in step 702, the process repeats step 702.

Otherwise, if a request to add the encryption type(s), encryption level(s), security level(s), and/or authentication level(s) is received in step 702, the block manager 123, in step 704, adds the authentication/encryption block 300 to the existing blockchain 200/blockchain 121. Based on the authentication/encryption block 300 being added to the existing blockchain 200/blockchain 121, the encryption type(s), encryption level(s), security level(s), and/or authentication level(s) are retroactively applied to the existing blockchain 200/121 per the metadata 301/applicability field 302 in the authentication/encryption block 300 in step 706.

The block manager 123 determines, in step 708, if the process is complete. If the process is not complete in step 708, the process goes back to step 702. Otherwise, if the process is complete in step 708, the process ends in step 710.

FIG. 8 is a flow diagram of a process for managing authentication based on retroactively added security level(s) and/or authentication level(s). The process starts in step 800. The authentication module 124, determines, in step 802, if a request to access blockchain data 204 is received. If a request to access the blockchain data 204 is not received in step 802, the process of step 802 repeats.

Otherwise, if the request to access the blockchain data 204 is received in step 802, the authentication module 124 determines, in step 804, if there are any authentication/encryption block(s) 300 in the blockchain 121. If there are not any authentication/encryption block(s) 300 in the blockchain 121, the authentication module 124 grants access as previously defined in step 806 and the process goes to step 810. If there are one or more authentication/encryptions blocks in the blockchain 121, the authentication module 124 grants access per the authentication/encryption block(s) 300 in step 808. Granting access includes unencrypting the blockchain data 204/field(s) 203 as described herein.

The authentication module 124 determines, in step 810, if the process is complete. If the process is not complete in step 810, the process goes back to step 802. Otherwise, if the process is complete in step 810, the process ends in step 812.

FIG. 9 is a flow diagram of a process for generating forward hashes 211 of blocks where encryption type(s) and/or encryption level(s) have been retroactively added to a blockchain 121. The process starts in step 900. The block manager 123 determines, in step 902, if there is a request to validate the blockchain 121. If there is not a request to validate the blockchain 121 in step 902, the process of step 902 repeats.

Otherwise, if there is a request to validate the blockchain 121 in step 902, the block manager 123 identifies the authentication/encryption block(s) 300 in the blockchain 121 in step 904. The block manager 123 determines, in step 906, how the blockchain data 204 is retroactively encrypted based on the authentication/encryption block(s) 300. For example, if a field 203 in a transaction block 202 has been retroactively encrypted, the block manager 123 determines that how many times the field 203 has been retroactively encrypted (e.g., once or twice). This includes the encryption type(s) and encryption level(s) for each encryption. The block manager 123 then unencrypts the blockchain data 204/field(s) 203 in the reverse order of how the blockchain data 204/field(s) 203 was retroactively encrypted to get the blockchain data 204/field(s) 203 back to their original values before the retroactive encryption in step 908.

The block manager 123 generates the forward hashes 211 for each block in the blockchain 121 using the original blockchain data 204/field(s) 203 before the retractive encryption in step 910. The block manger 123, determines, in step 912, if the generated forward hashes 211 match the forward hashes 211 in the blockchain 121. If the forward hashes 211 do not match in step 912, the block manager 123 identifies the blocks where the forward hash(es) 211 do not match in step 916. The block manger 123 indicates that the bad block(s) in step 918. For example, the block manager 123 may send a message to an administrator that the block has been tampered with. The process then goes to step 920. Otherwise, if the generated forward hash(es) 211 match the existing forward hash(s) 211, the block manger 123 indicates that the blockchain 121 is valid in step 914.

The block manger 123, determines, in step 920, if the process is complete. If the process is not complete in step 920, the process goes back to step 802. Otherwise, if the process is complete in step 920, the process ends in step 922.

Figure 10:
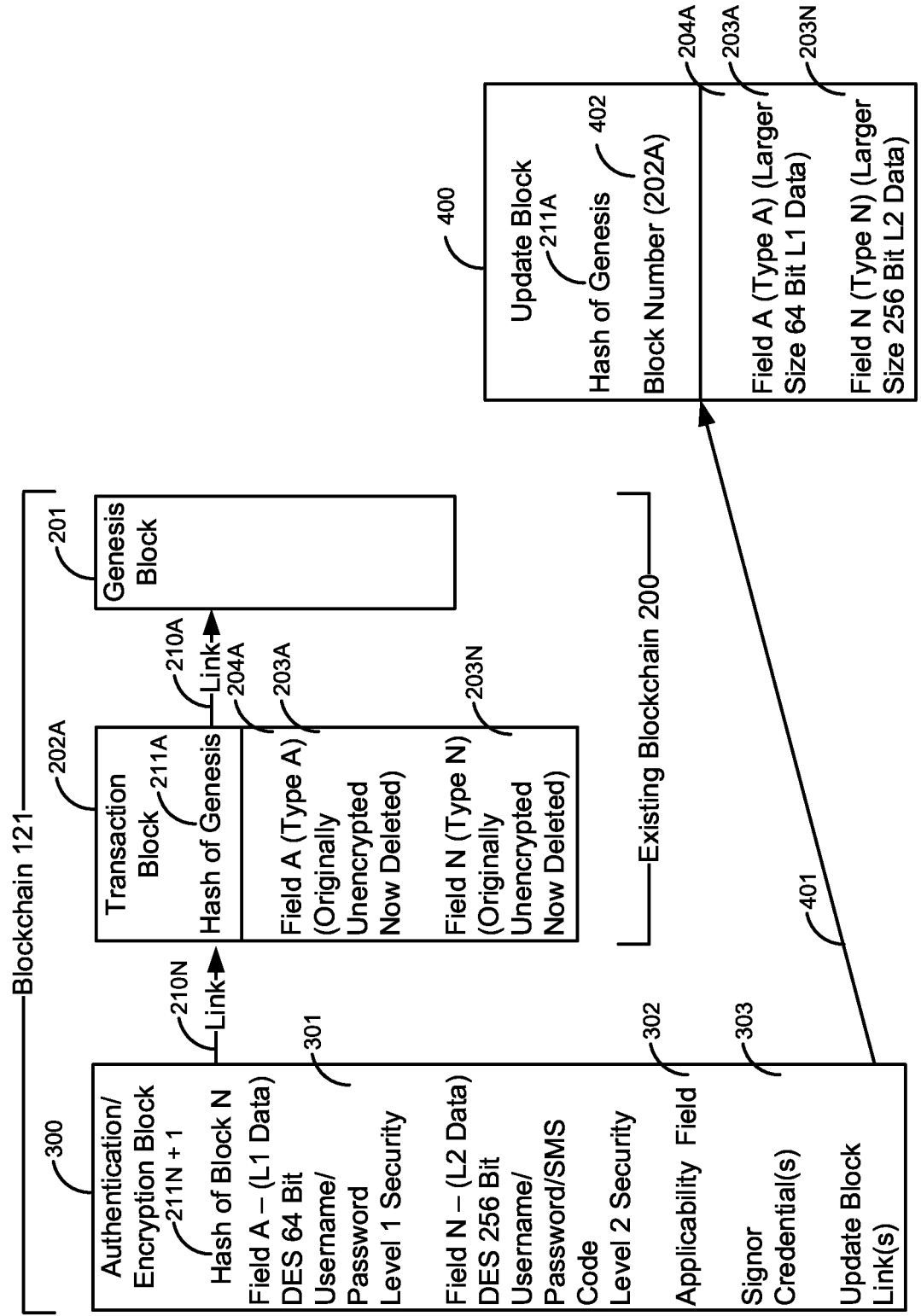
FIG. 10 is a diagram that shows how retroactive encryption can be added to a blockchain when a size of the blockchain data increases due to the retroactive encryption.

FIG. 10 is a diagram that shows how retroactive encryption can be added to a blockchain 121 when a size of the blockchain data 204 increases due to the retroactive encryption. One problem that may occur when the blockchain data 204 is retroactively encrypted is that the size of the blockchain data 204/field 203 may increase. This may cause issues because the data structure of the blockchain data 204 (e.g., a table size in a database) may not be able to accommodate the stronger encryption type/size because of size limitations of the database. The blockchain 121 of FIG. 10 solves this problem.

The blockchain 121 of FIG. 10 comprises the genesis block 201, the transaction block 202A and the authentication/encryption block 300 like FIG. 3 (minus transaction blocks 202B-202N for convenience). The blockchain data 204A (fields 203A-202N) is originally unencrypted.

When the retractive encryption is applied, the size of the fields 203A-202N may increase because of the type of encryption being used. To accommodate this situation, an update block 400 is created. The authentication/encryption block 300 has a link 401 to the update block 400. The update block 400 has the blockchain data 204A (fields 203A/203N) where the blockchain data 204A has been retroactively encrypted using the blockchain data 204A from fields 203A/203N in the transaction block 202A. In this example, field 203A in the update block 400 is encrypted using a DES 64-bit encryption. Field 203N in the update block 400 is retroactively encrypted using DES 256-bit encryption. The update block 400 also has the forward hash 211A of the genesis block 201 and a block number 402. The forward hash of the genesis block 211A may be optional. The block number 402 identifies the transaction block 202A that the update block 400 represents. If there are multiple transaction blocks there may be multiple update blocks 400 or the update block 400 may have the blockchain data 204/field(s) 203 for all the transaction blocks 202 that have been updated.

In addition, the fields 203A-203N in the transaction block 202A are changed. For example, the fields 203A-203N in the transaction block 202A may be deleted or obfuscated. This is to prevent having the blockchain data 204A in the fields 203A-203N in the transaction block 202A from being visible because the fields 203A-203N in the update block 400 are now retroactively encrypted.

While the processes herein are described using forward hashes 211, other types of hashing may be used. For example, instead of using a forward hash 211, a reverse hash may be used to verify the validity of the blockchain 121.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® CortexTMM processors, ARM® Cortex-A and ARIV1926EJS™ processors, other industry-equivalent processors, and may perform computational functions using any known or future-developed standard, instruction set, libraries, and/or architecture.

Any of the steps, functions, and operations discussed herein can be performed continuously and automatically.

However, to avoid unnecessarily obscuring the present disclosure, the preceding description omits several known structures and devices. This omission is not to be construed as a limitation of the scope of the claimed disclosure. Specific details are set forth to provide an understanding of the present disclosure. It should however be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that can supply and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosure.

Several variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

What is claimed is:

1. A system comprising:
a microprocessor; and
a computer readable medium, coupled with the microprocessor and comprising microprocessor readable and executable instructions that, when executed by the microprocessor, cause the microprocessor to:
receive a first request to retroactively add one or more of the following to an existing blockchain: a first encryption level, a first encryption type, a first security level, and a first authentication level;
add a first authentication/encryption block to the existing blockchain, wherein the first authentication/encryption block comprises the one or more of the first encryption level, the first encryption type, the first security level, and the first authentication level, wherein the first authentication/encryption block comprises an applicability field and wherein the applicability field applies to at least one of:
existing blocks in the existing blockchain;
specific types of blocks in the existing blockchain;
specific fields in the existing blocks in the existing blockchain;
specific fields in specific types of existing blocks in the existing blockchain;
new blocks that are added to the existing blockchain;
specific types of new blocks that are added to the existing blockchain;
specific fields in the new blocks that are added to the existing blockchain;
specific fields in specific types of the new blocks that are added to the existing blockchain; and
back to a previous authentication/encryption block; and
based on the added first authentication/encryption block in the existing blockchain, retroactively apply the one or more of the first encryption level, the first encryption type, the first security level, and the first authentication level to at least a portion of blockchain data in the existing blockchain.

2. The system of claim 1, wherein the one or more of the first encryption level, the first encryption type, the first security level, and the first authentication level comprises the first encryption level and/or the first encryption type and wherein retroactively applying the first encryption level and/or the first encryption type comprises retroactively encrypting at least one existing field in an existing block in the existing blockchain using the first encryption level and/or the first encryption type.

3. The system of claim 2, wherein retroactively applying first encryption level and/or the first encryption type does not include changing any existing hashes of any existing blocks in the existing blockchain.

4. The system of claim 3, wherein the microprocessor readable and executable instructions further cause the microprocessor to:
unencrypt the at least one existing field in the existing block in the existing blockchain;
generate a hash of the existing block in the existing blockchain based on the unencrypted at least one existing field; and
validate the existing blockchain based on the generated hash of the existing block in the existing blockchain.

5. The system of claim 1, wherein the one or more of the first encryption level, the first encryption type, the first security level, and the first authentication level comprises the first security level and/or the first authentication level and wherein retroactively applying first security level and/or the first authentication level comprises using the first security level and/or the first authentication level in the first authentication/encryption block to determine whether to authenticate a user for accessing an existing field in an existing block in the existing blockchain.

6. The system of claim 5, wherein the first security level and/or the first authentication level adds and/or changes at least one authentication type and/or the first security level required to authenticate a user for accessing the existing field in the existing block in the existing blockchain.

7. The system of claim 1, wherein the microprocessor readable and executable instructions further cause the microprocessor to:
receive a second request to retroactively add one or more of the following to the existing blockchain: a second encryption level, a second encryption type, a second security level, and a second authentication level;
add a second authentication/encryption block to the existing blockchain, wherein the second authentication/encryption block comprises the one or more of the second encryption level, the second encryption type, the second security level, and the second authentication level and wherein one or more of the first encryption level, the first encryption type, the first security level, and the first authentication level are different from the one or more of the second encryption level, the second encryption type, the second security level, and the second authentication level; and
retroactively apply the one or more of the second encryption level, the second encryption type, the second security level, and the second authentication level to the existing blockchain.

8. The system of claim 7, wherein the one or more of the first encryption level, the first encryption type, the first security level, and the first authentication level comprises the first encryption level and/or the first encryption type and wherein the one or more of the second encryption level, the second encryption type, the second security level, and the second authentication level comprises the second encryption level and/or the second encryption type.

9. The system of claim 8, wherein the first encryption level and/or the first encryption type is used to retroactively encrypt an existing field in an existing block in the existing blockchain and wherein the second encryption level and/or the second encryption type is also used to retroactively encrypt the existing field in the existing block in the existing blockchain.

10. The system of claim 1, wherein the first authentication/encryption block comprises an applicability field and wherein the applicability field applies to at least one of:

existing blocks in the existing blockchain;
specific types of blocks in the existing blockchain;
specific fields in the existing blocks in the existing blockchain; and
specific fields in specific types of existing blocks in the existing blockchain.

11. The system of claim 1, wherein the microprocessor readable and executable instructions further cause the microprocessor to:
receive a request to retroactively remove and/or downgrade one or more of: the first encryption level, the first encryption type, the first security level, and the first authentication level;
add a second authentication/encryption block to the existing blockchain, wherein the second authentication/encryption block identifies the one or more of the first encryption level, the first encryption type, the first security level, and the first authentication level to be removed and/or downgraded from the existing blockchain; and
based on the added second authentication/encryption block in the existing blockchain, retroactively remove and/or downgrade the one or more of the first encryption level, the first encryption type, the first security level, and the first authentication level from the at least a portion of the blockchain data in the existing blockchain.

12. The system of claim 1, wherein the one or more of the first encryption level, the first encryption type, the first security level, and the first authentication level comprises the first encryption level and/or the first encryption type, wherein the first encryption level and/or the first encryption type increases a size of the at least a portion of the blockchain data, and wherein the microprocessor readable and executable instructions further cause the microprocessor to:
create an update block that accommodates the increased size of the at least a portion of the blockchain data, wherein the first authentication/encryption block has a link to the update block; and
change the at least a portion of the blockchain data in the existing blockchain.

13. A method comprising:
receiving, by a microprocessor, a first request to retroactively add one or more of the following to an existing blockchain: a first encryption level, a first encryption type, a first security level, and a first authentication level;
adding, by the microprocessor, a first authentication/encryption block to the existing blockchain, wherein the first authentication/encryption block comprises the one or more of the first encryption level, the first encryption type, the first security level, and the first authentication level, wherein the first authentication/encryption block comprises an applicability field and wherein the applicability field applies to at least one of:
existing blocks in the existing blockchain;
specific types of blocks in the existing blockchain;
specific fields in the existing blocks in the existing blockchain;
specific fields in specific types of existing blocks in the existing blockchain;
new blocks that are added to the existing blockchain;
specific types of new blocks that are added to the existing blockchain;
specific fields in the new blocks that are added to the existing blockchain;

specific fields in specific types of the new blocks that are added to the existing blockchain; and back to a previous authentication/encryption block; and based on the added first authentication/encryption block in the existing blockchain, retroactively applying, by the microprocessor, the one or more of the first encryption level, the first encryption type, the first security level, and the first authentication level to at least a portion of blockchain data in the existing blockchain.

14. The method of claim 13, wherein the one or more of the first encryption level, the first encryption type, the first security level, and the first authentication level comprises the first encryption level and/or the first encryption type and wherein retroactively applying the first encryption level and/or the first encryption type comprises retroactively encrypting at least one existing field in an existing block in the existing blockchain using the first encryption level and/or the first encryption type.

15. The method of claim 14, wherein retroactively applying first encryption level and/or the first encryption type does not include changing any existing hashes of any existing blocks in the existing blockchain and further comprising:
  unencrypting the at least one existing field in the existing block in the existing blockchain;
  generating a hash of the existing block in the existing blockchain based on the unencrypted at least one existing field; and
  validating the existing blockchain based on the generated hash of the existing block in the existing blockchain.

16. The method of claim 13, wherein the one or more of the first encryption level, the first encryption type, the first security level, and the first authentication level comprises the first security level and/or the first authentication level and wherein retroactively applying first security level and/or the first authentication level comprises using the first security level and/or the first authentication level in the first authentication/encryption block to determine whether to authenticate a user for accessing an existing field in an existing block in the existing blockchain.

17. The method of claim 13, further comprising:
  receiving a second request to retroactively add one or more of the following to the existing blockchain: a second encryption level, a second encryption type, a second security level, and a second authentication level;
  adding a second authentication/encryption block to the existing blockchain, wherein the second authentication/encryption block comprises the one or more of the second encryption level, the second encryption type, the second security level, and the second authentication level and wherein one or more of the first encryption level, the first encryption type, the first security level, and the first authentication level are different from the one or more of the second encryption level, the second encryption type, the second security level, and the second authentication level; and
  retroactively applying the one or more of the second encryption level, the second encryption type, the second security level, and the second authentication level to the existing blockchain.

18. The method of claim 13, wherein the applicability field applies to at least one of:
  new blocks that are added to the existing blockchain;
  specific types of new blocks that are added to the existing blockchain;
  specific fields in the new blocks that are added to the existing blockchain;
  specific fields in specific types of the new blocks that are added to the existing blockchain; and
  back to a previous authentication/encryption block.

19. The method of claim 13, further comprising:
  receiving a request to retroactively remove and/or downgrade one or more of: the first encryption level, the first encryption type, the first security level, and the first authentication level;
  adding a second authentication/encryption block to the existing blockchain, wherein the second authentication/encryption block identifies the one or more of the first encryption level, the first encryption type, the first security level, and the first authentication level to be removed and/or downgraded from the existing blockchain; and
  based on the added second authentication/encryption block in the existing blockchain, retroactively removing and/or downgrading the one or more of the first encryption level, the first encryption type, the first security level, and the first authentication level from the at least a portion of the blockchain data in the existing blockchain.

20. A system comprising:
  a microprocessor; and
  a computer readable medium, coupled with the microprocessor and comprising microprocessor readable and executable instructions that, when executed by the microprocessor, cause the microprocessor to:
  receive a first request to retroactively add at one or more of the following to an existing blockchain: a first encryption level, a first encryption type, a first security level, and a first authentication level;
  create a data structure, wherein the data structure comprises the one or more of the first encryption level, the first encryption type, the first security level, and the first authentication level;
  based on the data structure, retroactively apply the one or more of the first encryption level, the first encryption type, the first security level, and the first authentication level to at least a portion of blockchain data in the existing blockchain;
  receive a second request to retroactively add one or more of the following to the existing blockchain: a second encryption level, a second encryption type, a second security level, and a second authentication level;
  add a second authentication/encryption block to the existing blockchain, wherein the second authentication/encryption block comprises the one or more of the second encryption level, the second encryption type, the second security level, and the second authentication level and wherein one or more of the first encryption level, the first encryption type, the first security level, and the first authentication level are different from the one or more of the second encryption level, the second encryption type, the second security level, and the second authentication level; and
  retroactively apply the one or more of the second encryption level, the second encryption type, the second security level, and the second authentication level to the existing blockchain.

\* \* \* \* \*